United States Patent Office 3,526,631
Patented Sept. 1, 1970

3,526,631
OXIMES OF DIBENZO[a,d]CYCLOHEPTEN-5-ONES
Claude Ivan Judd, Mequon, Wis., assignor to Colgate-Palmolive Company, New York, N.Y., a corporation of Delaware
No Drawing. Continuation-in-part of application Ser. No. 640,351, May 22, 1967. This application Apr. 28, 1969, Ser. No. 819,942
Int. Cl. C07d 51/70
U.S. Cl. 260—268          8 Claims

ABSTRACT OF THE DISCLOSURE

The compounds are aminoalkylated oximes of dibenzo[a,d]cyclohepten-5-ones which are useful as central nervous system stimulants and antidepressants. Among the compounds disclosed are O-[β-(4-methyl-1-piperazinyl)ethyl]-10,11-dihydrodibenzo[a,d]cyclohepten-5-one and O-[β-(4-methyl-1-piperazinyl)ethyl]-3-chloro-10,11-dibenzo[a,d]cyclohepten-5-one oxime.

RELATED CASES

The present application is a continuation-in-part of my copending application Ser. No. 640,351 filed May 22, 1967. which is in turn a continuation-in-part of my earlier application Ser. No. 467,720 filed June 28, 1965, now abandoned.

BRIEF SUMMARY OF THE INVENTION

The compounds may be represented by the following formula:

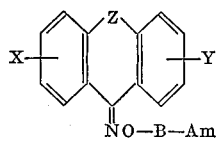

and nontoxic physiologicaly acceptable acid addition salts in which Z may be either —CH=CH— or —CH$_2$—CH$_2$, X and Y represent hydrogen or one or more ring substituents such as a halogen, particularly chlorine, a lower alkyl containing from one to four carbon atoms such as methyl, ethyl, propyl or butyl, an S-lower alkyl containing from one to four carbon atoms such as thiomethyl, thioethyl, thiopropyl, thiobutyl, an O-lower alkyl containing from one to four carbon atoms such as methoxy, ethoxy, isopropyloxy, butyloxy and trifluoromethyl, B represents a straight or branched lower alkylene containing from one to eight carbon atoms such as methylene, ethylene and propylene, and Am represents a cyclic amino group such as piperazino, 4-lower alkyl piperazino, particularly 4-methyl piperazino, 4-hydroxy lower alkyl piperazino, particularly 4-hydroxy ethyl piperazino, pyrrolidino and piperidino.

The novel aminoalkylated oximes of dibenzo[a,d]cyclohepten-5-ones may be prepared by reacting a dibenzo[a,d]cyclohepten-5-one with hydroxylamine to form a dibenzo[a,d]cyclohepten-5-one oxime, forming an anion of the oxime by treating it with a base and reacting the oxime anion with an aminoalkyl ester such as an aminoalkyl halide or an aminoalkyl tosylate. This process can be represented as follows:

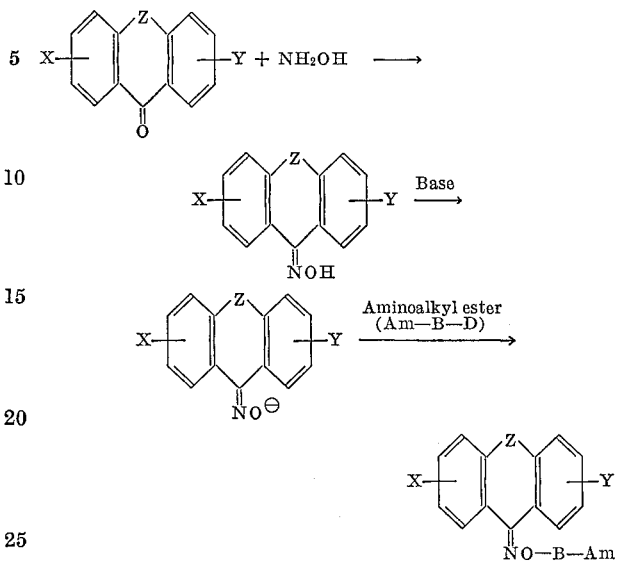

wherein X, Y, Z, B and Am have the significance previously assigned and wherein D is a halogen such as chlorine or bromine or a tosyloxy group.

Illustrative examples of some of the dibenzo[a,d]cyclohepten-5-ones which may be employed as starting materials in the process are:

dibenzo[a,d]cyclohepten-5-one,
10,11-dihydrodibenzo[a,d]cyclohepten-5-one,
3-chloro-10,11-dihydrodibenzo[a,d]cyclohepten-5-one,
7-methoxy-10,11-dihydrodibenzo[a,d]cyclohepten-5-one,
3-ethyl-10,11-dihydrodibenzo[a,d]cyclohepten-5-one,
3,7-dichloro-10,11-dihydrodibenzo[a,d]cyclohepten-5-one,
2,3,7,8-tetrachloro-10,11-dihydrodibenzo[a,d]cyclohepten-5-one,
2-thiomethyl-10,11-dihydrodibenzo[a,d]cyclohepten-5-one,
3-trifluoromethyl-10,11-dihydrodibenzo[a,d]cyclohepten-5-one,
3,7-dichlorodibenzo[a,d]cyclohepten-5-one, and
2,3-methylenedioxydibenzo[a,d]cyclohepten-5-one.

These dibenzo[a,d]cyclohepten-5-ones may be prepared in accordance with the process disclosed by A. C. Cope and S. W. Fenton in the Journal of the American Chemical Society, 73, 1673 (1951).

The oximes are prepared by treating the dibenzo[a,d]cyclohepten-5-ones with a hydroxylamine salt such as hydroxylamine hydrochloride in the presence of a suitable base such as pyridine, sodium acetate or sodium hydroxide. The reaction is readily effected employing conventional conditions of solvent, temperature, and the like. A preferred procedure employs excess base such as pyridine as an organic solvent and heating the mixture to reflux. A method for preparing 10,11-dihydrodibenzo[a,d]cyclohepten-5-one oxime is shown by Monroe et al., in the Journal of Medicinal Chemistry, 6, 255–261 (1963).

The dibenzo[a,d]cyclohepten-5-one oximes are converted into their oxime anions by treating them with a base such as sodium hydride, sodamide, sodium hydroxide or potassium hydroxide. The oxime anion is then allowed to react with an aminoalkyl ester to form the final aminoalkyl-dibenzo[a,d]cyclohepten-5-one oximes. The reaction with the aminoalkyl ester is advisedly conducted in an organic reaction medium such as toluene. The reaction is promoted by the use of elevated temperatures, particularly advantageous is the reflux temperature. The reaction is generally completed in from one to four hours. The reaction mixture is then cooled and the product is isolated by conventional means such as by extracting with a solvent. These bases may be converted into their non-toxic physiologically acceptable acid addition salts by treating the bases in the presence of an inorganic or organic acid such as hydrochloric acid, maleic acid or fumaric acid.

Examples of the aminoalkyl esters which may be employed in this reaction are:

β-(4-methyl-1-piperazinyl)ethyl chloride,
β-(4-ethyl-1-piperazinyl)ethyl chloride,
β-(4-hydroxyethyl-1-piperazinyl)ethyl bromide,
β-(1-pyrrolidyl)ethyl chloride,
γ-(1-piperidyl)propyl chloride, and
γ-(1-piperidyl)butyl chloride.

Some of the aminoalkyl-dibenzo[a,d]cyclohepten-5-one oximes which may be prepared in this fashion are:

O-[β-(4-methyl-1-piperazinyl)ethyl]-10,11-dihydrodibenzo[a,d]cyclohepten-5-one oxime,
O-[β-(4-ethyl-1-piperazinyl)ethyl]-10,11-dihydrodibenzo[a,d]cyclohepten-5-one oxime,
O-[β-(4-ethyl-1-piperazinyl)ethyl]-dibenzo[a,d]cyclohepten-5-one oxime,
O-[γ-(4-hydroxyethyl-1-piperazinyl)ethyl]-10,11-dihydroxydibenzo[a,d]cyclohepten-5-one oxime,
O-[γ-(4-hydroxyethyl-1-piperazinyl)ethyl]-dibenzo[a,d]cyclohepten-5-one oxime,
O-[β-(4-methyl-1-piperazinyl)ethyl]-dibenzo[a,d]-cyclohepten-5-one oxime,
O-[β-(4-ethyl-1-piperazinyl)ethyl]-3-chloro-10,11-dihydrodibenzo[a,d]cyclohepten-5-one oxime,
O-[β-(4-methyl-1-piperazinyl)ethyl]-3-chloro-10,11-dihydrodibenzo[a,d]cyclohepten-5-one oxime,
O-[β(1-pyrrolidyl)propyl]-3,7-dimethoxy-10,11-dihydrodibenzo[a,d]cyclohepten-5-one oxime, and
O-[γ-(1-piperidyl)butyl]-2,3,7,8-tetramethyldibenzo[a,d]cyclohepten-5-one oxime.

The compounds of this invention which are unsymmetrical because of the placement of the ring substituents X and Y exist in isomeric forms known as syn and anti.

The aminoalkyl-dibenzo[a,d]cyclohepten-5-one oximes of this invention as well as their physiologically acceptable acid addition salts are central nervous system stimulants and possess antidepressant-type activity. For example, the compound O-[β-(4-methyl-1-piperazinyl)ethyl]-10,11-dihydrodibenzo[a,d]cyclohepten-5-one oxime, when administered in intraperitoneal doses of 10 mg./kg. produced behavioral profiles in mice which were characterized by central nervous system stimulation and resembled the profiles produced by the administration of known antidepressants.

The aminoalkyl-dibenzo[a,d]cyclohepten-5-one oximes disclosed in this application as well as their salts may be administered to animals as pure compounds. It is advisable, however, to first combine one or more of the compounds with a suitable pharmaceutical carrier to attain a more satisfactory size to dosage relationship. Either liquid or solid pharmaceutical carriers may be employed.

Unit dosage forms such as tablets and capsules may contain any suitable predetermined amount of one or more of the active agents described in this application and may be administered one or more at a time at regular intervals. Such unit dosage forms, however, should generally contain a concentration of from 0.1% to 10% by weight of one or more of the active agents. Unit dosage forms should advisedly contain between 5 to 150 mg. of the active agent. In normal practice the daily dosage of the active ingredients will not exceed 75 mg./kg. of the patient's body weight.

A typical tablet may have the following composition:

| | Mg. |
|---|---|
| (1)—O-[β-(4-methyl-1-piperazinyl)propyl]-10,11-dihydrodibenzo[a,d]cyclohepten-5-one oxime fumarate | 10 |
| (2)—Starch U.S.P. | 57 |
| (3)—Lactose U.S.P. | 73 |
| (4)—Talc U.S.P. | 9 |
| (5)—Stearic acid | 6 |

Powders (1), (2) and (3) are slugged, then granulated, mixed with (4) and (5) and tableted.

The oral route is generally preferred for administering the compounds of this invention. However, other routes of administration such as parenteral may be employed.

The following examples are presented to illustrate this invention:

EXAMPLE 1

10,11-dihydrodibenzo[a,d]cyclohepten-5-one oxime

A mixture of 20.8 g. (0.1 mole) 10,11-dihydrodibenzo[a,d]cyclohepten-5-one, 20.8 g. (0.3 mole) hydroxylamine hydrochloride and 300 ml. pyridine are stirred at reflux for twenty-four hours. The mixture is evaporated under reduced pressure and suspended in water. The insoluble organic portions are extracted into ethyl ether and the ether is washed with 5% hydrochloric acid, 5% sodium bicarbonate and water. After drying over anhydrous potassium carbonate the solution is filtered and the filtrate evaporated under reduced pressure. The residues are triturated with Skelly B and the solids collected by filtration yielding the product, M.P. 163–166°.

*Analysis.*—Calcd. for $C_{15}H_{13}NO$ (percent): N, 6.28. Found (percent): N, 5.96.

EXAMPLE 2

Dibenzo[a,d]cyclohepten-5-one oxime

A mixture of 4.1 g. (0.02 mole) dibenzo[a,d]cyclohepten-5-one, 4.2 g. (0.06 mole) hydroxylamine hydrochloride and 75 ml. pyridine is heated under reflux for 18 hours. The mixture is evaporated under reduced pressure, covered with ether and washed with 5% hydrochloric acid, 5% sodium hydroxide and water. The organic material is dried over anhydrous potassium carbonate, filtered and evaporated under reduced pressure. The residues are triturated under Skelly B and collected by filtration yielding the product, M.P. 184–185°.

*Analysis.*—Calcd. for $C_{15}H_{11}NO$ (percent): C, 81.43; H, 5.01. Found (percent): C, 81.38; H, 4.95.

EXAMPLE 3

3-chloro-10,11-dihydrodibenzo[a,d]cyclohepten-5-one oxime

A mixture of 65.3 g. (0.27 mole) 3-chloro-10,11-dihydrodibenzo[a,d]cyclohepten-5-one, 56.3 g. (0.81 mole) hydroxylamine hydrochloride and 800 ml. pyridine is stirred at reflux for 12 hours. The solvents are removed under reduced pressure and the residues are covered with one liter of ether and washed with 250 ml. portions of 3 N hydrochloric acid, 5% sodium hydroxide and water. The dried organic fraction is evaporated and the residues are triturated in Skelly B and collected by filtration, yielding the product. Further recrystallization from acetonitrile and Darco yields the product, M.P. 198–201°.

*Analysis.*—Calcd. for $C_{15}H_{12}ClNO$ (percent): C, 69.91; H, 4.70; N, 5.44; Cl, 13.76. Found (percent): C, 69.91; H, 4.70; N, 5.34; Cl, 13.79.

EXAMPLE 4

O-[β-(4-methyl-1-piperazinyl)ethyl]-10,11-dihydrodibenzo[a,d]cyclohepten-5-one oxime An aqueous solution of 16.8 g. (0.075 mole) 4-methyl-1-piperazinylethylchloride dihydrochloride is covered with 100 ml. toluene and saturated with potassium carbonate. The aqueous fraction is washed repeatedly with toluene, the toluene fractions are combined, dried and filtered.

A mixture of 11.2 g. (0.05 mole) 10,11-dihydrodibenzo[a,d]-cyclohepten-5-one oxime and 2.4 g. (0.05 mole) 50% sodium hydride in 100 ml. dry toluene is stirred at reflux for one hour, cooled to 25° C. and the above solution of 4-methyl-1-piperazinylethylchloride added and the mixture stirred at reflux for three hours. The cooled reaction mixture is washed with water and the dried organic fraction evaporated under reduced pressure yielding a brown oil. The crude material (0.05 mole) and 11.6 g. (0.10 mole) maleic acid are warmed in sufficient ethanol to cause solution (150 ml.) and allowed to stand overnight. The solids which form on cooling are collected by filtration yielding the product, M.P. 170–172° C. Recrystallization from 1,000 ml. hot ethanol yields the product, M.P. 174–175° C.

*Analysis.*—Calcd. for $C_{30}H_{35}N_3O_9$ (percent): C, 61.95; H, 6.06; N, 7.24; N.E., 145.4. Found (percent): C, 61.98; H, 6.25; N, 7.27; N.E., 146.0.

EXAMPLE 5

O-[β-(4-methyl-1-piperazinyl)ethyl]-dibenzo[a,d]cyclohepten-5-one oxime

The procedure of Example 4 is repeated employing dibenzo[a,d]cyclohepten-5-one oxime in place of 10,11-dihydrodibenzo[a,d]cyclohepten-5-one oxime to obtain O-[β-(4-methyl-1-piperazinyl)ethyl]-dibenzo[a,d]cyclohepten-5-one oxime.

EXAMPLE 6

O-[β-(4-methyl-1-piperazinyl)ethyl]-3-chloro-10,11-dihydrodibenzo[a,d]cyclohepten-5-one oxime A solution of 8.4 g. (0.037 mole) 4-methyl-1-piperazinyl ethyl chloride hydrochloride in 50 ml. water, covered with 50 ml. toluene, is saturated with potassium carbonate. The aqueous fraction is washed repeatedly with toluene, the toluene fractions are combined, dried and filtered.

A mixture of 6.4 g. (0.025 mole) 3-chloro-10,11-dihydrodibenzo[a,d]cyclohepten-5-one oxime and 1.2 g. (0.025 mole) 50% sodium hydride in 100 ml. dry toluene is stirred at reflux for one hour, cooled to 25° C. and the above solution of 4-methyl-1-piperazinylethyl chloride is added and the resulting mixture stirred at reflux for three hours. The cooled reaction mixture is washed with water and the dried organic fraction evaporated under reduced pressure yielding a brown oil. The crude product (0.025 mole) and 5.8 g. (0.05 mole) fumaric acid are warmed in sufficient ethanol to dissolve (700 ml.), filtered and allowed to cool. The solids which form on cooling are collected by filtration yielding the product, M.P. 195–196° C. Recrystallization from 500 ml. hot ethanol yields the pure product, M.P. 195–196° C.

*Analysis.*—Calcd. for $C_{26}H_{30}ClN_3O_5$ (percent): C, 62.45; H, 6.05; Cl, 7.09; N, 8.40. Found (percent): C, 62.45; H, 6.14; Cl, 7.01; N, 8.42.

EXAMPLE 7

The procedure of Example 6 is repeated employing in place of 4 - methyl - 1 - piperazinylethyl chloride hydrochloride the following aminoalcohols:

β-(4-hydroxyethyl-1-piperazinyl)ethyl bromide,
β-(1-pyrrolidyl)propyl chloride, and
γ-(1-piperidyl)propyl chloride, respectively, to obtain O - [β - (4 - hydroxyethyl - 1 - piperazinyl)ethyl] - 3-chloro - 10,11 - dihydrodibenzo[a,d]cyclohepten - 5-one oxime, O - [β - (1 - pyrrolidyl)propyl] - 3 - chloro - 10,11 - dihydrodibenzo[a,d]cyclohepten-5-one oxime, and O - [γ - (1 - piperidyl)propyl] - 3 - chloro - 10,11 - dihydrodibenzo[a,d]cyclohepten - 5 - one oxime, respectively.

I claim:

1. A compound selected from the group consisting of compounds having the formula

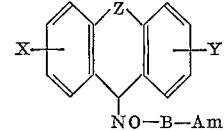

and nontoxic physiologically acceptable acid addition salts thereof wherein Z is a member selected from the group consisting of —CH=CH— and —CH$_2$—CH$_2$—, X and Y are selected from the group consisting of hydrogen, halogen, lower alkyl, S-lower alkyl, O-lower alkyl and trifluoromethyl, B is an alkylene selected from the group consisting of straight lower alkylene and branched lower alkylene, and Am is a member selected from the group consisting of piperazino, 4-lower alkyl piperazino and 4-hydroxy lower alkyl piperazino.

2. A compound of claim 1 in which Z is —CH=CH—.

3. A compound of claim 1 in which Z is

—CH$_2$—CH$_2$—

4. A compound of claim 1 in which X and Y are hydrogen or chloro.

5. A compound of claim 1 in which Z is —CH=CH—, X and Y are hydrogen or chloro, B is ethylene or propylene and Am is 4-lower alkyl piperazino.

6. A compound of claim 1 in which Z is

—CH$_2$—CH$_2$—

X and Y are hydrogen or chloro, B is ethylene or propylene and Am is 4-lower alkyl piperazino.

7. A compound of claim 1 in which X is hydrogen, Y is chloro, B is ethylene and Am is 4-methylpiperazino.

8. A compound of claim 1 in which X and Y are hydrogen, B is ethylene and Am is 4-methylpiperazino.

References Cited

UNITED STATES PATENTS

| | | | |
|---|---|---|---|
| 3,258,488 | 6/1966 | Judd et al. | 260—268 |
| 3,270,055 | 8/1966 | Engelhard et al. | 260—566 |
| 3,271,426 | 9/1966 | Villani | 260—268 X |
| 3,349,128 | 10/1967 | Judd | 260—268 X |
| 3,370,061 | 2/1968 | Corts | 260—268 X |

DONALD G. DAUS, Primary Examiner

U.S. Cl. X.R.

260—293.4, 294.7, 326.8, 326.81, 566, 586; 424—250, 267, 274